United States Patent
O'Connor et al.

(10) Patent No.: US 9,141,810 B2
(45) Date of Patent: Sep. 22, 2015

(54) ARCHITECTURE FOR VIRTUAL SECURITY MODULE

(71) Applicant: Micron Technology, Inc., Boise, ID (US)

(72) Inventors: Dennis M. O'Connor, Chandler, AZ (US); John P Brizek, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 78 days.

(21) Appl. No.: 13/932,927

(22) Filed: Jul. 1, 2013

(65) Prior Publication Data

US 2013/0298205 A1     Nov. 7, 2013

Related U.S. Application Data

(63) Continuation of application No. 11/529,987, filed on Sep. 29, 2006, now Pat. No. 8,479,264.

(51) Int. Cl.
    *G06F 21/00*     (2013.01)
    *G06F 21/60*     (2013.01)
    *G06F 21/53*     (2013.01)
    *G06F 21/62*     (2013.01)

(52) U.S. Cl.
    CPC .............. *G06F 21/60* (2013.01); *G06F 21/53* (2013.01); *G06F 21/6227* (2013.01); *G06F 21/6281* (2013.01); *G06F 2221/2149* (2013.01)

(58) Field of Classification Search
    CPC ............ H04L 29/06836; G06F 21/121; G06F 21/604; G06F 21/62; G06F 21/6218
    USPC .............. 726/4, 26, 27; 713/2, 164, 176, 194, 713/100
See application file for complete search history.

(56) References Cited

U.S. PATENT DOCUMENTS

| | | | |
|---|---|---|---|
| 7,409,487 B1 | 8/2008 | Chen et al. | |
| 7,467,239 B2 * | 12/2008 | Nicolai et al. | 710/26 |
| 7,552,419 B2 | 6/2009 | Zimmer et al. | |
| 7,587,595 B2 * | 9/2009 | Scarlata et al. | 713/167 |
| 8,479,264 B2 | 7/2013 | O'Connor et al. | |
| 2002/0194389 A1 | 12/2002 | Worley, Jr. et al. | |

(Continued)

FOREIGN PATENT DOCUMENTS

WO    WO-2008042191 A2    4/2008

OTHER PUBLICATIONS

"Chinese Application Serial No. 200780035702.1, First Office Action mailed Jul. 30, 2010", 18 pgs.

(Continued)

*Primary Examiner* — Justin T Darrow
*Assistant Examiner* — Hee Song
(74) *Attorney, Agent, or Firm* — Schwegman Lundberg & Woessner, P.A.

(57) ABSTRACT

A device supports the processing of multiple active applications in a processor through a mapping system that securely identifies and differentiates commands issued by clients. An entity selection signal is generated by the mapping system to signal the processor to process an algorithm and provide services for a specific client using the commands identified for that client and data permitted by a client tracking system for that client. Other data accesses and commands identified for other clients are restricted when processing the algorithm.

21 Claims, 3 Drawing Sheets

(56) References Cited

U.S. PATENT DOCUMENTS

| | | | |
|---|---|---|---|
| 2005/0138370 | A1 | 6/2005 | Goud et al. |
| 2005/0138393 | A1 | 6/2005 | Challener et al. |
| 2005/0198633 | A1 | 9/2005 | Lantz et al. |
| 2005/0210467 | A1 | 9/2005 | Zimmer et al. |
| 2005/0246552 | A1 | 11/2005 | Bade et al. |
| 2005/0278790 | A1 | 12/2005 | Birk et al. |
| 2006/0020781 | A1 | 1/2006 | Scarlata et al. |
| 2006/0026384 | A1 | 2/2006 | Brandt et al. |
| 2006/0212939 | A1 | 9/2006 | England et al. |
| 2006/0230401 | A1* | 10/2006 | Grawrock .......... 718/1 |
| 2006/0294331 | A1 | 12/2006 | Forrer, Jr. et al. |
| 2007/0056033 | A1 | 3/2007 | Grawrock |
| 2007/0079120 | A1 | 4/2007 | Bade et al. |

OTHER PUBLICATIONS

"European Application Serial No. 07838900.4, Extended European Search Report mailed Oct. 12, 2010", 4 pgs.

"Internation Serial Application No. PCT/US2007/020797, Search Report mailed Mar. 12, 2008", 1-3.

"International Application Serial No. PCT/IT2008/000812, International Search Report mailed Mar. 12, 2008", 2 pgs.

"International Application Serial No. PCT/US2007/020797, International Preliminary Report on Patentability and Written Opinion mailed Mar. 31, 2009", 5 pgs.

"International Application Serial No. PCT/US2007/020797, Written Opinion Mar. 12, 2008", 4 pgs.

"International Application Serial No. PCT/US2007/020797, Written Opinion mailed Mar. 12, 2008", 1-4.

"Korean Application Serial No. 10-2009-7004786, Notice of Preliminary Rejection Office Action mailed Oct. 15, 2010", 8 pgs.

"Russian Application Serial No. 200911623/08(022310), Offical Action mailed Jul. 13, 2010", 11 pgs.

"Trusted Computing Platform Alliance (TCPA)", Trusted Computing Group, Inc., Main Specification, (2003), 332 pgs.

Alves, Tiago, et al., "TrustZone: Integrated Hardware and Software Security", ARM, (Jul. 2004), 1-12.

Berger, S., et al., "vTPM: Virtualizing the Trusted Platform Module", IBM Research Report, RC23879(WO0602-126), (Feb. 14, 2006), 17 pgs.

Garfinkel, T., et al., "Terra: A Virtual Machine-Based Platform for Trusted Computing", ACM Symposium on Operating systems Priniciples, (Oct. 19-22, 2003), 193-206.

Pourzandi, M, "Setting Up Virtual Security Zones in a Linux Cluster", Linux Journal, (Oct. 1, 2004).

* cited by examiner

ARCHITECTURE FOR VIRTUAL SECURITY MODULE

PRIORITY APPLICATION

This application is a continuation of U.S. application Ser. No. 11/529,987, filed Sep. 29, 2006, which is incorporated herein by reference in its entirety.

BACKGROUND

Connected mobile computing and wireless communication technologies used for business and commerce need to protect user data and secrets. The architecture may include security engines to perform digital signing and key wrapping operations, hash operations and random number generation, with hardware and supporting software providing encryption and decryption capabilities to ensure data privacy and enhanced security.

The architecture in these systems restricts the use of secrets so that only authorized applications use particular secrets, but currently every command that uses secrets go through a cryptographic authorization check. There is a need for a mechanism to support multiple active applications that execute simultaneously that removes the need for checking authorization with every command.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
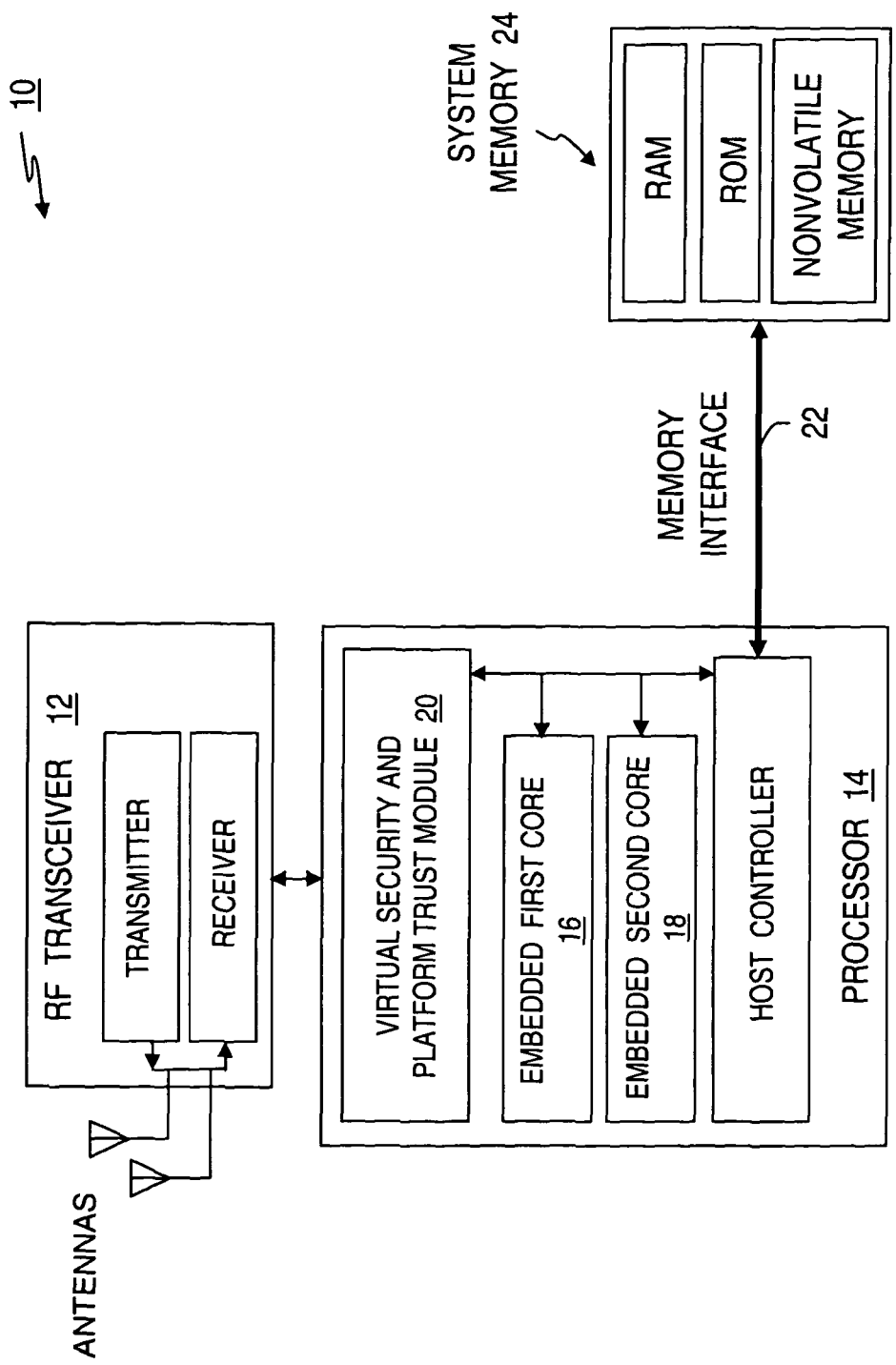
FIG. 1 is a diagram for an embodiment of a wireless device that illustrates a virtual security and platform trust module in support of multiple active applications that execute simultaneously in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As shown in FIG. 1, embodiments of the present invention may be illustrated in a device 10 that includes a radio to allow communication in an RF/location space with other devices. Accordingly, device 10 may be a communications device such as a smart phone that possesses a standardized operating system and is able to multitask between various applications and operate in a wireless network, but it should be understood that the present invention may be incorporated in devices other than wireless devices.

The figure illustrates a transceiver 12 that both receives and transmits a modulated signal from one or more antenna. A processor 14 receives the frequency down-converted, filtered signal that is converted to a baseband, digital signal. Processor 14, in general, processes algorithm functions that fetch instructions, generate decodes, find operands, and perform appropriate actions, then stores results. Processor 14 may use multiple cores 16 and 18 to calculate both baseband and applications processing functions where processing workloads may be shared across the cores. Processor 14 may transfer data through a memory interface 22 to a system memory 24 that may include a combination of memories such as a Random Access Memory (RAM), a Read Only Memory (ROM) and a nonvolatile memory, although neither the type nor variety of memories included in system memory 24 is a limitation of the present invention.

Device 10 employs a virtual security and platform trust module 20 that includes hardware configured to perform cryptographic functions and software to protect secrets from attackers. In general, module 20 may create, store and manage cryptographic keys; perform digital signature operations and anchor chain of trust for keys and the digital certificates. Thus, module 20 provides various services to secure files and folders and secure storage and management of user information, usernames, passwords and personal information.

Figure 2:
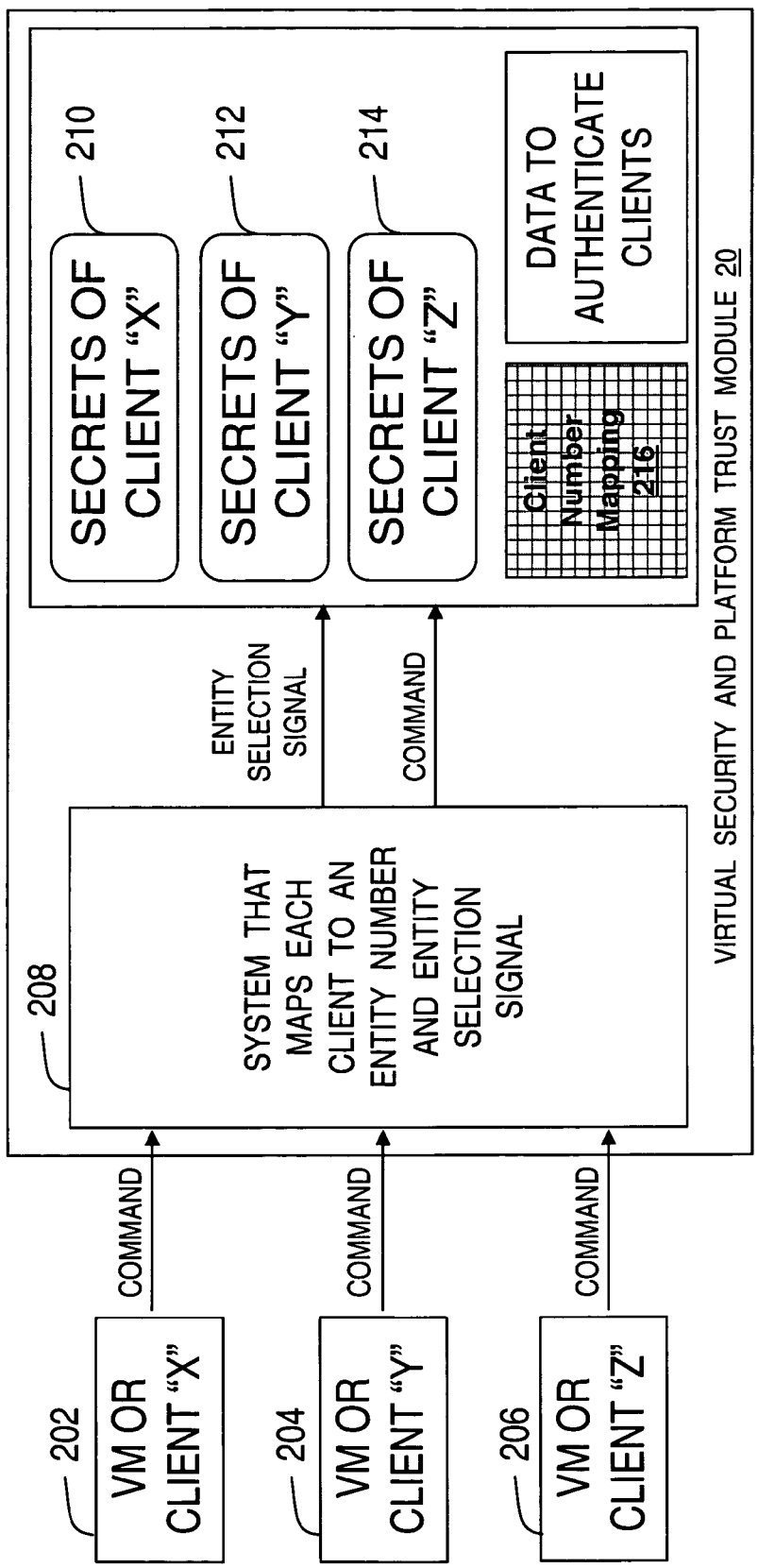
FIG. 2 is a block diagram that illustrates a mapping system to differentiate and protect client secrets in accordance with the present invention.

FIG. 2 illustrates, in accordance with the present invention, a portion of module 20 that creates an association between Virtual Machines (VMs) or Security Domains (SDs) and various sets of secrets belonging to specific clients. The VM may be a group of processing cores or processing devices that are administered with common rules and procedures on a network. Further, the VM or Domains may be software entities having resources that enable tasks to be performed.

The figure shows a mapping system 208 that maps commands issued by a client with an entity selection signal that is generated to identify that client with the commands. The commands and entity selection signal may then be passed into the configuration of the individual hardware and software components that together perform a service. Virtual machines or clients 202, 204 or 206 may issue commands into platform-specific directives for information flow and access control. For example, upon client "X" 202 issuing a command, mapping system 208 receives that command and generates an entity selection signal to clearly identify that command with client 202. The command and entity selection signal are then used to configure the protected execution environments to execute algorithms and perform calculations using only secrets assigned to client "X" 210. Other secrets such as secrets of client "Y" 212 and secrets of client "Z" 214 pertain to other clients (respectively client "Y" 204 and client "Z" 206) and are restricted and not available to the algorithms and calculations performed for client "X" 202.

Thus, device 10 is a processing system having authentication capabilities to support multiple active applications. A mapping system 208 receives commands issued by the multiple clients 202, 204 and 206, passes those commands to a processing device along with the entity selection signals that specifically identify those commands as being associated with that client. Operations may then be performed, the operations being specific to the client identified by the entity selection signal. Again, the operations for the identified client are restricted to using commands and stored data that is attached with rights previously assigned to that client. Data stored with attached rights assigned to other clients is restricted data and unavailable.

The figure shows a client number mapping block 216 that uses the entity selection signal and the commands from the client as identified by that signal to provide security and operational management for requested services. Mapping system 208 in cooperation with client number mapping 216 simplify trust management in large distributed systems by enabling flexible deployment of secure services. The collections of secrets specific to various clients are maintained and protected, with access to those secrets only granted to the specific client as identified by mapping system 208 and enabled by client number mapping 216.

Virtual security and platform trust module 20 in device 10 is designed to provide an explicit and autonomous protection of secrets reserved for a particular client prior to the processing of a service. The application developer is relieved from the burden of implementing and verifying security-related cryptographic authorization functions for every command issued for service processing. Instead of being individually specified on a per-user or per-system basis the applications or service to be run maintains the association between the virtual machines or security domains and the designated set of secrets for all subsequent commands sent to the device until the application is disassociated from those secrets.

Figure 3:
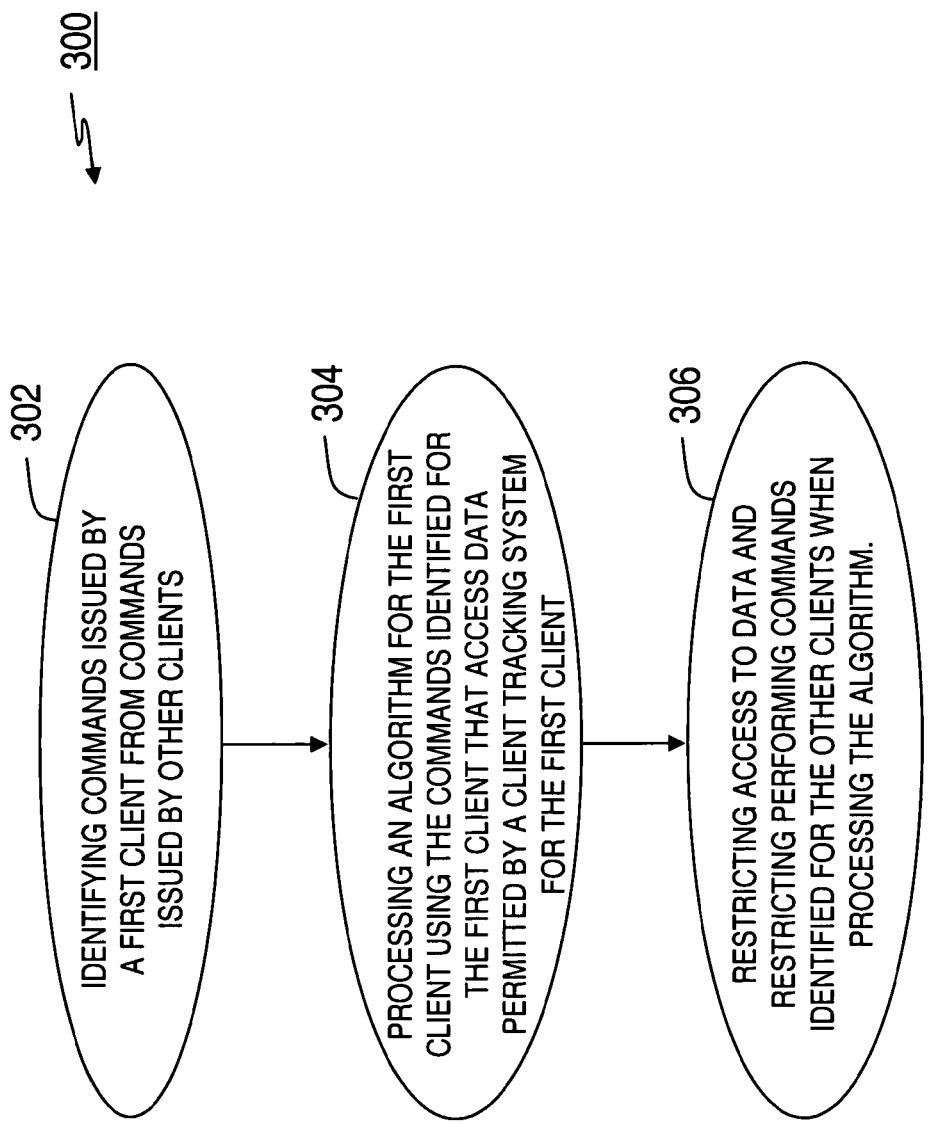
FIG. 3 is a flowchart that illustrates a method of identifying commands issued by a particular client and processing an algorithm that accesses memory data for that client in accordance with the present invention.

FIG. 3 is a flowchart that in accordance with various embodiments of the present invention illustrates a method of identifying commands issued by a particular client and processing an algorithm that accesses memory data for that client in accordance with the present invention. Thus, method 300 may be used in a computer system that supports multiple virtual machines or multiple security domains to protect secrets that applications are allowed to use. Method 300 securely maintains the association between the virtual machines or security domains and the designated set of secrets for all subsequent commands sent to the processing device until the application is disassociated from those secrets.

In some embodiments, method 300, or portions thereof, is performed by a controller, a processor, or an electronic system, embodiments of which are shown in the various figures. Method 300 is not limited by the particular type of apparatus, software element, or system performing the method. The various actions in method 300 may be performed in the order presented, or may be performed in a different order. Further, in some embodiments, some actions listed in FIG. 3 may be omitted from method 300.

Method 300 is shown beginning at block 302 in which a monitor block (such as mapping system 208 shown in FIG. 1) monitors commands issued from the multiple virtual machines or multiple security domains. Commands emanating from clients are identified as being issued by those specific clients. The method performed at block 302 generates the entity selection signal to identify the VM/SD that an application is running in and communicates that identity to the peripheral device every time a command is sent to the device. The identifier is provided to the client number mapping 218 in the device.

Block 304 shows the device processing an algorithm for the client using the commands identified for that client. Data stored in cache and in system memory may be accessed, but secrets stored in memory may only be accessed as permitted by the client tracking system (client number mapping 218, see FIG. 2). The mapping system 208 and client number mapping 218 control resources to allow secure communication from the Operating System (OS) or hypervisor to the device as to which secrets and which commands in the device the applications should be allowed to use. Block 306 shows that by maintaining the association between the VM or SD and the designated set of secrets for all subsequent commands sent to the device until the application is disassociated from those secrets, applications are prevented from using secrets that would compromise the security of the system.

In operation, hardware within the processor may include state bits that uniquely identify each VM or SD. In some processors this may be a Process Identifier (PID) or Address Space Identifier (ASID). When an application running in a VM or SD sends a command to a peripheral, the processor hardware sends signals to the peripheral informing the peripheral which VM or SD is sending the command. This signaling may be done via dedicated signals output by the processor or by encoding the information into other signals such as the address bus. The peripheral would then ensure that the commands being sent and data being used to execute those commands are appropriate to the VM or SD sending the command.

From one run to the next, the identifier associated with the VM or SD running a particular application may change, so a dynamic mapping from the SD/VM identifier to a set of secrets is provided. When a secret-using application is launched, the OS (or hypervisor) first authenticates the application checking both its integrity and its identity. Once the application is authenticated the OS then communicates to the peripheral both the VM/SD identifier and a token that unlocks the use of the set of associated stored secrets and the set of allowed operations for the application. When the application is halted or suspended the OS sends another command to the peripheral to cancel the association. The application may also end the association itself, but only the association in place for itself. The OS may include a special VM/SD identifier that the hardware uses so that only the OS may send commands to associate a VM/SD identifier with a set of secrets.

It should be pointed out that the peripheral may store a number of associations between the VM/SD and secrets simultaneously. It may further be possible for multiple VMs or SDs to be simultaneously associated with the same set of secrets. This may be the case when multiple instances of the same program are running under different VMs or SDs, and for a single VM or SD to be associated with several sets of secrets.

By now it should be apparent that circuitry and methods have been provided to support the processing of multiple active applications in a processor. Embodiments of the invention push the security down to the hardware level in conjunction with software through a mapping system that identifies commands issued by a first client from commands issued by other clients. The entity selection signal generated by the mapping system signals the processor to process an algorithm for the first client using the commands identified for the first client and data permitted by a client tracking system for the first client. Other data accesses and commands identified for other clients are restricted when processing the algorithm.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A processing system, comprising:
   a mapping device to receive a command issued by a client and to generate a dedicated signal that is separate from the command, the dedicated signal to uniquely identify the client, the mapping device further being configured to periodically change the dedicated signal and dynamically map the changed dedicated signal to the commands received from the client; and a processing device to receive the command and the dedicated signal to verify the identity of the client, and, upon verification of the identity of the client, the processing device to enable access to stored data and secure services, the processing device further to restrict the client to data and services attached with rights previously assigned to the client.

2. The processing system of claim 1, wherein the processing device is to maintain an association between subsequent commands received from the identified client and access to the stored data and secure services without needing to verify the identity of the client for the subsequent commands occurring between the periodic changing of the dedicated signal.

3. The processing system of claim 2, wherein the processing device is to maintain the access until the identified client is dissociated from further access.

4. The processing system of claim 1, wherein the processing device is further to allow the identified client to access secrets and perform additional operations that are attached with the rights previously assigned to the client.

5. The processing system of claim 1, further comprising a tracking system to support processing of multiple active applications for the identified client.

6. The processing system of claim 1, wherein the mapping device is further to identify and differentiate the command issued by the client from other commands issued by other clients.

7. A system, comprising:
a processor to receive a command issued by a client;
a platform trust module coupled to the processor to create an association between the client and data attached with rights previously assigned to the client;
a mapping system to generate an entity selection signal and map the command issued by the client with the entity selection signal, the mapping system further being configured to periodically change the entity selection signal and dynamically map a changed entity selection signal to commands received from the client; and
a client number mapping device coupled to a system memory and the mapping system to receive the command and the entity selection signal to authenticate the client.

8. The system of claim 7, wherein the client number mapping device is further to allow access to a protected execution environment associated with the client based on the authentication of the client.

9. The system of claim 7, wherein the client number mapping device is further to provide security and operational management for the client based on the authentication of the client.

10. The system of claim 7, wherein the platform trust module is further configured to perform cryptographic functions, the cryptographic functions to include storage, creation, and management of cryptographic keys.

11. The system of claim 7, wherein the entity selection signal specifically identifies the command and subsequent commands occurring between the periodic changing of the entity selection signal as being associated with the client.

12. A method of accessing secure data, the method comprising:
receiving a first set of commands issued by a first client and a second set of commands issued by a second client;
identifying the first set of commands as being associated with the first client and the second set of commands as being associated with the second client;
generating a first entity selection signal associated with the first client and a second entity selection signal associated with the second client to identify uniquely the first client and the second client, respectively;
periodically changing the first entity selection signal and the second entity selection signal while continuing to identify uniquely the first client and the second client, respectively;
communicating the first set of commands, the second set of commands, the first entity selection signal, and the second entity selection signal to a client number mapping device to authenticate the first client and the second client; and
separately maintaining the association between the first client and the second client and respective data associated with each client for all subsequent commands occurring between the periodic changing of the first entity selection signal and the second entity selection signal until the association is canceled.

13. The method of claim 12, further comprising encoding the first entity selection signal and the entity selection signal separately onto an address bus signal.

14. The method of claim 12, wherein operations requested through the first command identified by the first entity selection signal as being from the first client are restricted only to data attached with rights previously assigned to the first client and operations requested through the second command identified by the second entity selection signal as being from the second client are restricted only to data attached with rights previously assigned to the second client.

15. A method of accessing secure data, the method comprising:
receiving a command issued by a first client;
generating a dedicated signal associated with the first client, the dedicated signal being separate from the command;
periodically changing the dedicated signal associated with the first client and dynamically ma in the changed dedicated signal to the commands received from the client;
communicating the command and the dedicated signal to a device to access data associated with the first client;
upon authentication of the first client, restricting access only to data associated with the first client based on rights previously assigned to the first client; and
supporting multiple active applications for the first client without checking authorization for subsequent commands occurring between the periodic changing of the dedicated signal after the first command is verified against the dedicated signal.

16. The method of claim 15, wherein the dedicated signal is communicated to the device every time a subsequent command is received from the first client to uniquely identify the first client from other clients.

17. The method of claim 15, wherein the data associated with the first client include secrets reserved for the first client.

18. The method of claim 15, wherein the device is a client tracking system coupled to a peripheral storage device containing the data associated with the first client.

19. The method of claim 15, further comprising processing an algorithm for the first client using the dedicated signal and the command issued by the first client to access data permitted by a client tracking system for the first client while restricting access to the data and restricting performing other commands identified for other clients when processing the algorithm.

20. The method of claim 19, further comprising using the dedicated signal to authenticate the first client before using the command in processing the algorithm.

21. The method of claim 15, further comprising processing the multiple active applications simultaneously.

\* \* \* \* \*